United States Patent
Easton

(10) Patent No.: US 8,724,310 B2
(45) Date of Patent: May 13, 2014

(54) CLAMP ASSEMBLY AND METHOD OF CLAMPING A DISK DRIVE

(75) Inventor: Michael Easton, Waterlooville (GB)

(73) Assignee: Xyratex Technology Limited, Havant (GB)

( * ) Notice: Subject to any disclaimer, the term of this patent is extended or adjusted under 35 U.S.C. 154(b) by 343 days.

(21) Appl. No.: 13/029,889

(22) Filed: Feb. 17, 2011

(65) Prior Publication Data

US 2011/0222235 A1    Sep. 15, 2011

Related U.S. Application Data

(60) Provisional application No. 61/313,338, filed on Mar. 12, 2010.

(51) Int. Cl.
*H05K 7/20* (2006.01)

(52) U.S. Cl.
USPC ............ 361/679.39; 361/679.33; 361/679.37; 361/724; 312/223.1; 312/223.2

(58) Field of Classification Search
USPC ........................................ 361/679.37, 679.39
See application file for complete search history.

(56) References Cited

U.S. PATENT DOCUMENTS

| | | | |
|---|---|---|---|
| 6,625,041 B1* | 9/2003 | Chen | 361/829 |
| 6,762,932 B2* | 7/2004 | Regimbal et al. | 361/679.33 |
| 7,079,380 B2* | 7/2006 | Wubs | 361/679.35 |
| 7,134,895 B1* | 11/2006 | Choy et al. | 439/326 |
| 7,241,159 B1* | 7/2007 | Chen | 439/326 |
| 7,262,958 B2* | 8/2007 | Marroquin et al. | 361/679.33 |
| 7,486,523 B2* | 2/2009 | Wu et al. | 361/747 |
| 7,911,777 B2* | 3/2011 | Fan et al. | 361/679.36 |
| 8,085,552 B2* | 12/2011 | Takao | 361/807 |
| 2006/0139872 A1* | 6/2006 | Li et al. | 361/685 |
| 2006/0171110 A1* | 8/2006 | Li | 361/685 |

\* cited by examiner

*Primary Examiner* — Anthony Q Edwards
(74) *Attorney, Agent, or Firm* — Pillsbury Winthrop Shaw Pittman LLP

(57) ABSTRACT

There is disclosed herein a clamp assembly and a method for clamping a disk drive to a substrate. The disk drive has a disk drive connector. The clamp assembly includes a resilient biasing element mounted to the substrate. The clamp assembly also has a substrate connector. When a disk drive connector is connected to the substrate connector, the resilient biasing element biases the disk drive and the substrate connector together.

19 Claims, 6 Drawing Sheets

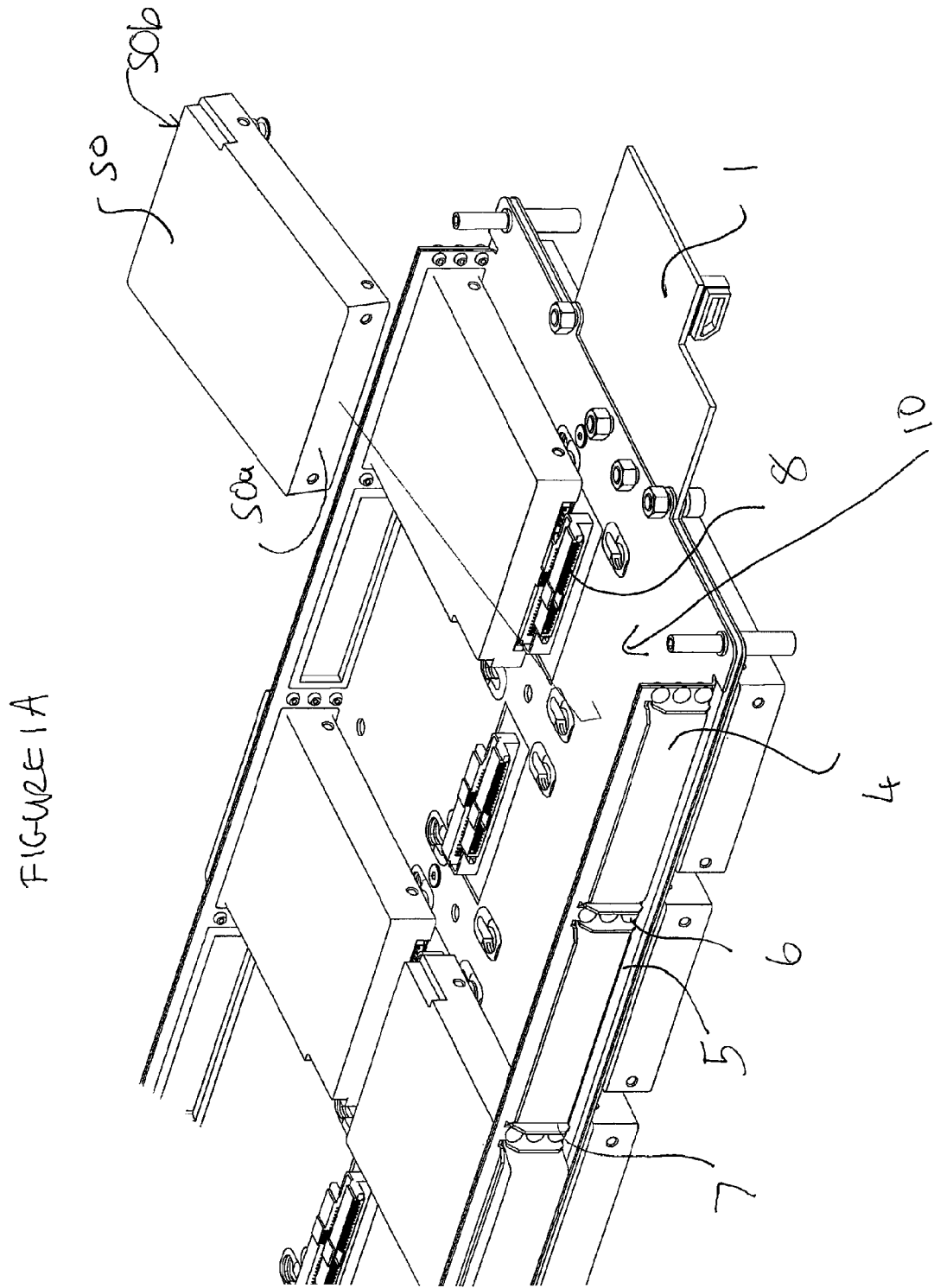

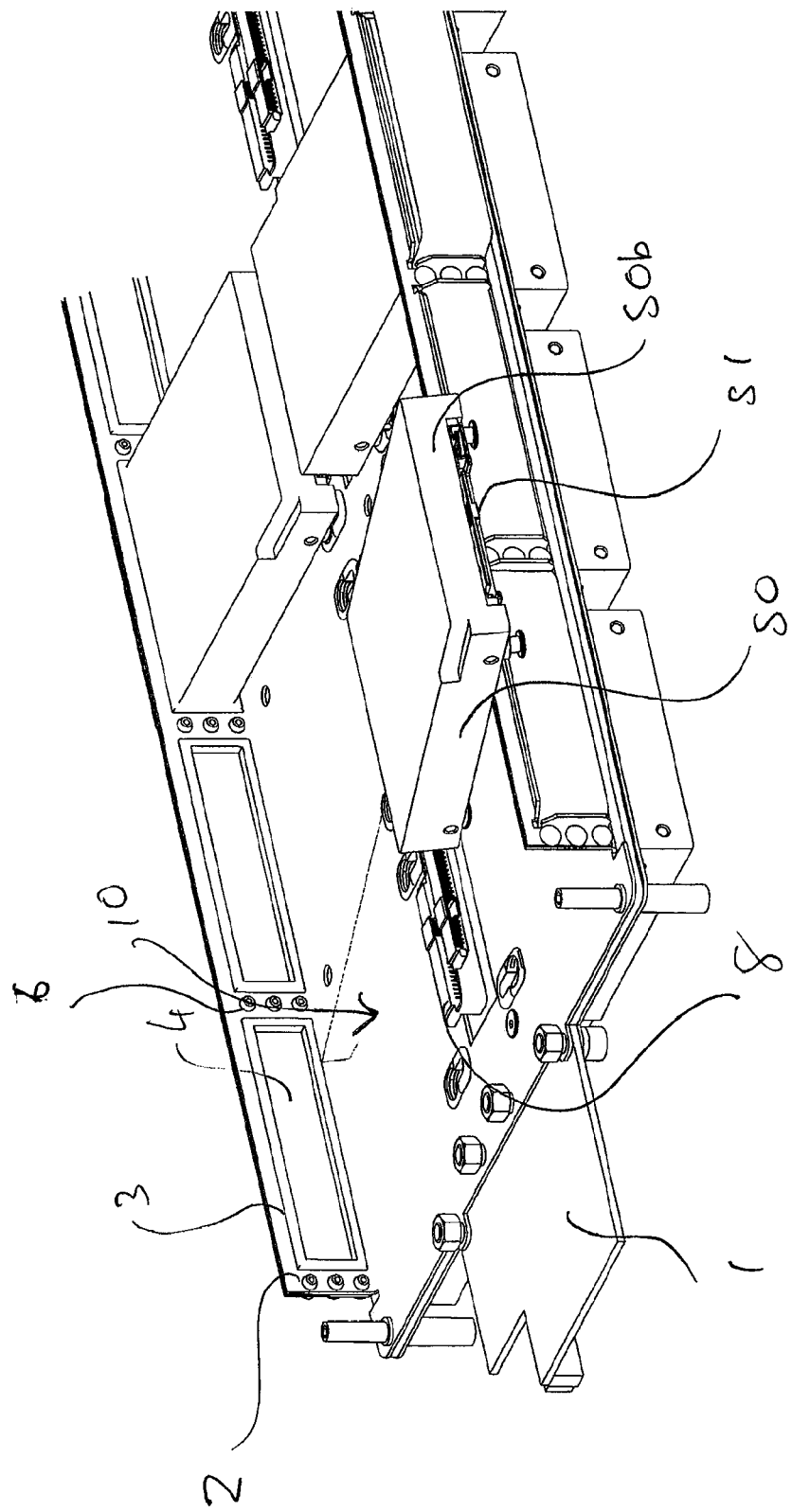

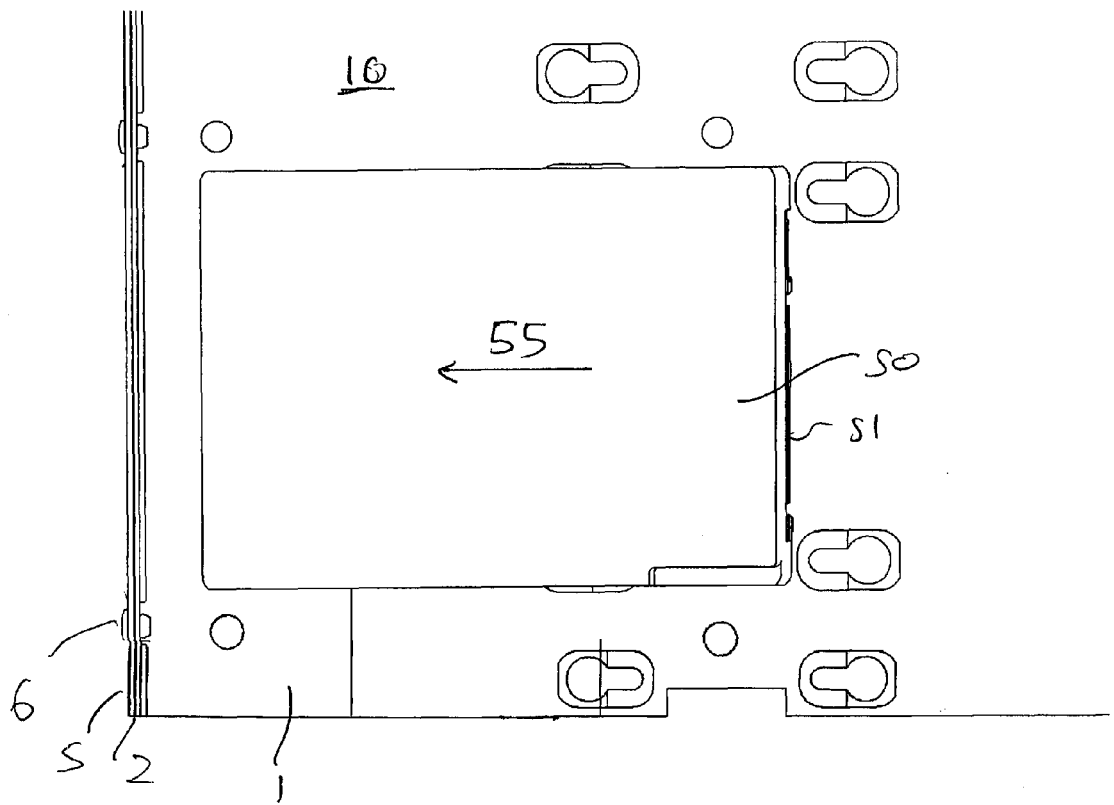
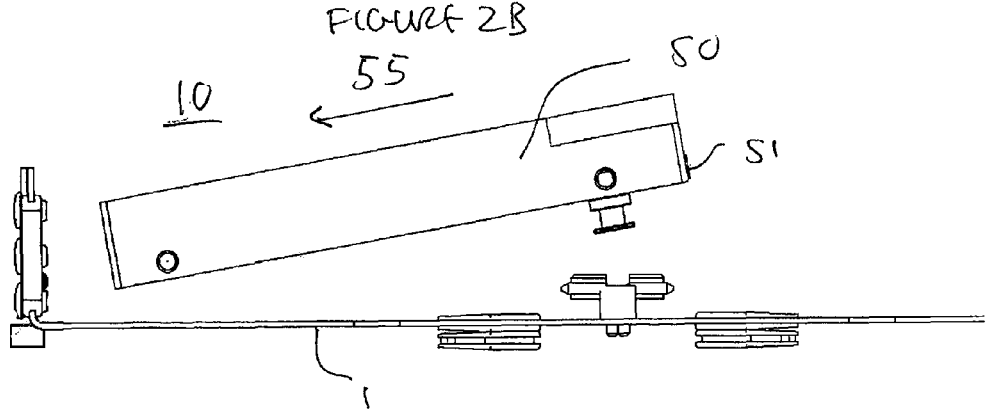

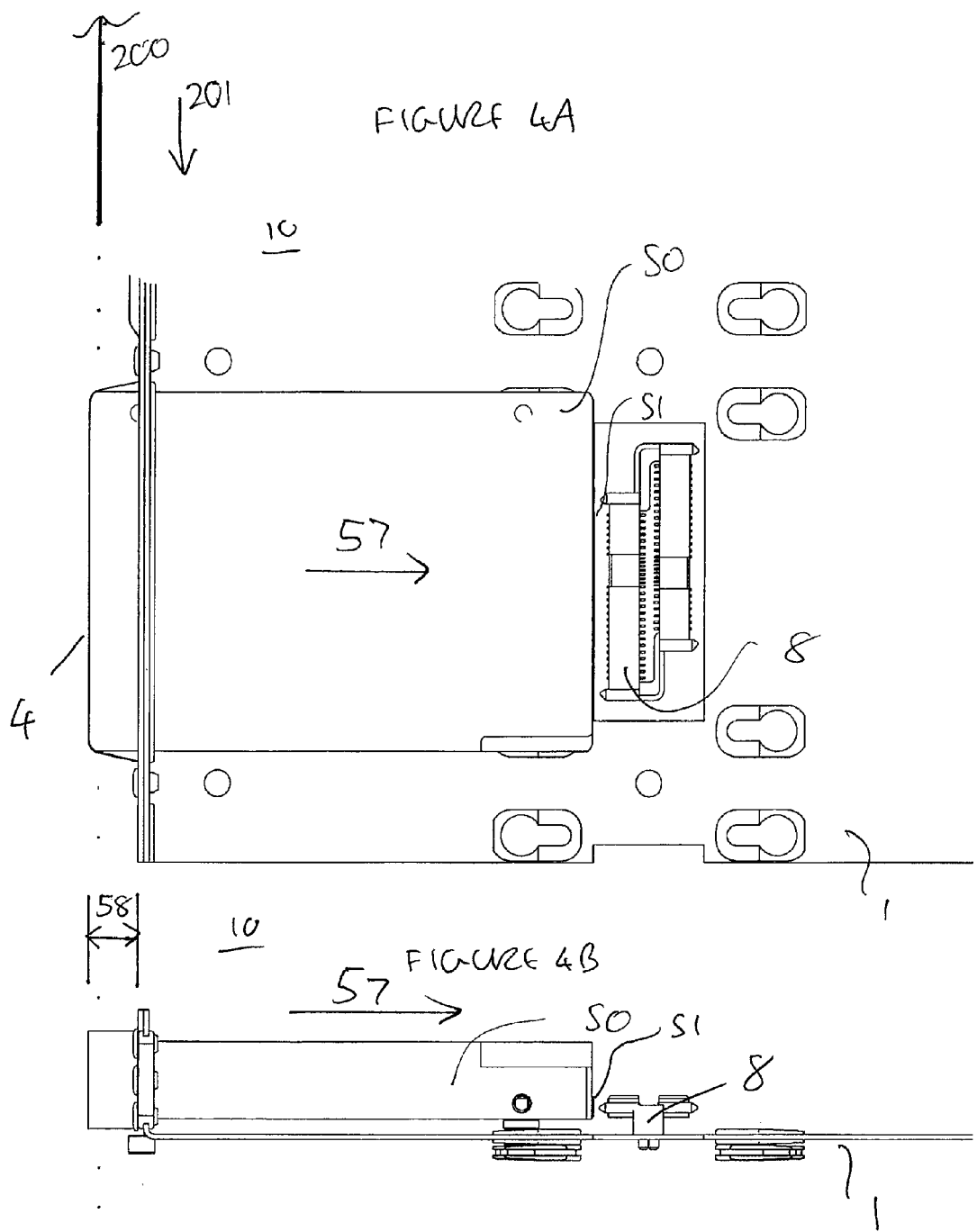

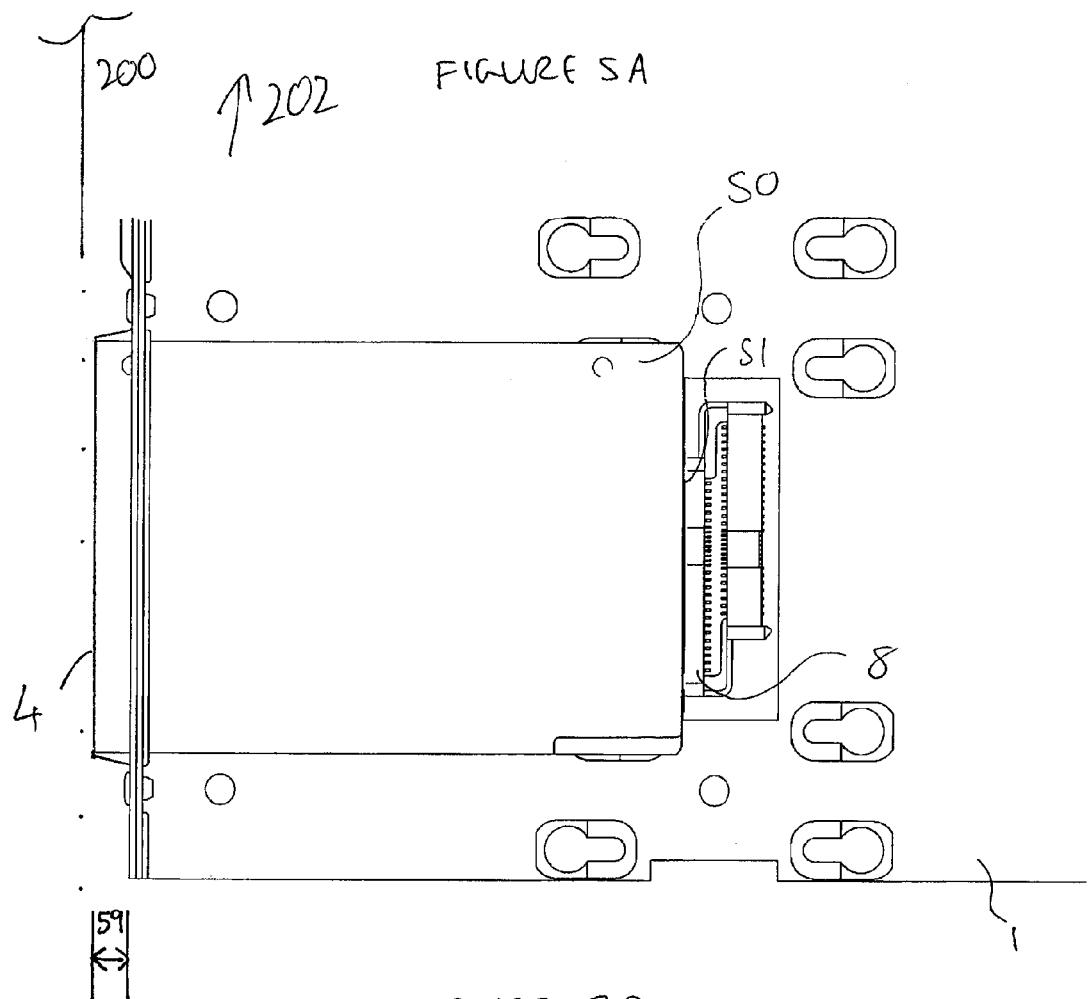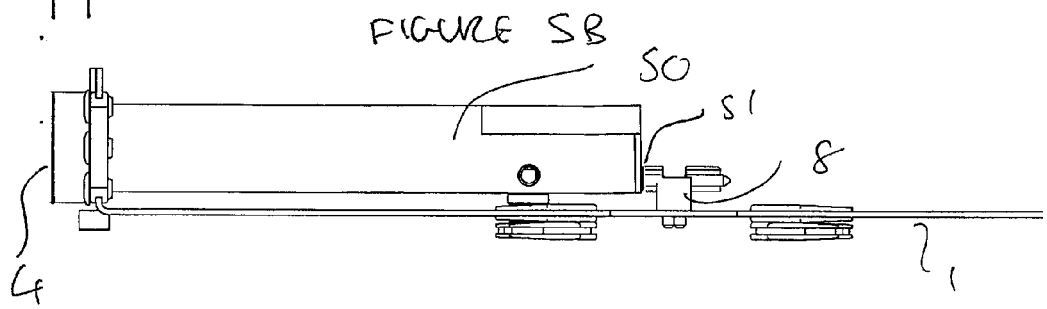

CLAMP ASSEMBLY AND METHOD OF CLAMPING A DISK DRIVE

This application claims the benefit of priority to U.S. application Ser. No. 61/313,338, filed Mar. 12, 2010, the content of which is hereby incorporated by reference.

The present invention relates to a clamp assembly and to a method of clamping a disk drive.

There are a number of applications when it is necessary to mount a disk drive in some other apparatus. These include for example when the disk drive is tested during manufacture and when the disk drive is in use for data storage applications or the like.

Various mounting schemes are known. In some schemes, for example in some storage enclosures, the disk drive is inserted into a carrier, which is in turn received in bays in the storage enclosure. Often tools are necessary for releasing the disk drive unit from the apparatus. This makes the operation of removing a disk drive from the apparatus and inserting another time consuming and inconvenient. For example, this requires the operator to have the correct tool on hand, and leads to a risk of dropping the tool or a fastener such as a bolt in the apparatus, potentially leading to damage. Also, space for the use of tools and manipulation of disk drives is often limited.

The mounting arrangement also needs to be secure and to preferably be able to isolate the disk drive from vibration, which mainly arises from operation of nearby disk drives or other moving parts in the overall system. The mounting arrangement also needs to make electrical connection to the disk drive. Typically, the disk drive is manually loaded into a carrier and secured by a fastening, and maneuvered by hand so that appropriate data and electrical connections to the disk drive are made. However, this and the other similar known arrangements do not lend themselves to automated loading and unloading of disk drives using robots or other automated machinery.

According to a first aspect of the present invention, there is provided a clamp assembly for clamping a disk drive to a substrate, the disk drive having a disk drive connector, the clamp assembly comprising: a resilient biasing element mounted to the substrate; and, a substrate connector, wherein when a disk drive connector is connected to the substrate connector, the resilient biasing element biases the disk drive and the substrate connector together.

This allows the disk drive to be easily inserted and removed from the apparatus, either manually or using robotics. In the preferred embodiment, it is simply necessary to advance the disk drive against the bias of the biasing element until the disk drive connector clears the substrate connector. The disk drive connector and the substrate connector can then be aligned. The disk drive can then be moved in the reverse direction, helped by the bias of the biasing element, until the connectors mate. The biasing element biases the disk drive and the substrate connector together, ensuring a secure, positive connection. Appropriate selection of the biasing member can also help damp vibration of the disk drive during use, for example by changing the resilience of the biasing member or changing the amount of elastic deformation undergone by the biasing member when the disk drive is in the clamped position to control the amount of preload in the clamping position.

The disk drive can be simply removed from the clamp assembly by following the opposite sequence of steps.

No tools are required for these operations. The clamp is also simple to manufacture and has relatively few parts, making this relatively inexpensive to manufacture. The clamp assembly requires relatively little space compared with prior art disk drive clamping schemes.

In a preferred embodiment, the substrate connector is fixed relative to the substrate, and the biasing element is arranged to bias the disk drive in a biasing direction towards the substrate connector.

In a preferred embodiment, the substrate connector has a plugging direction directed towards the biasing element.

This arrangement means that the plugging direction and the biasing direction are substantively aligned. Therefore the disk drive is held securely between the connector and the biasing element. The bias also helps making the connection between the disk drive and the substrate connector.

In a preferred embodiment, the depth of the biasing element in the biasing direction is small.

This helps save space on the substrate. Preferably, the biasing element extends beyond the portion of the disk drive unit biased by the biasing element by a distance of less than 10 mm, or more preferably less than 5 mm, or still more preferably less than 2 mm, or yet still more preferably less than 1 mm.

In a preferred embodiment, the clamp assembly comprises a support member projecting from the substrate, the biasing element being fixed to the support member wherein, when a disk drive is connected to the substrate connector, the support member does not protrude beyond said end of the disk drive in the biasing direction.

This helps reduce the amount of space on the substrate required for the clamp assembly.

In a preferred embodiment, the support member has a window defined therethrough, the biasing element being at least partially disposed about the aperture of the window, wherein when a disk is connected to the substrate connector, an end of the disk drive passes through the window.

The window offers a convenient attachment point for the biasing element, particularly for the preferred embodiment of a sheet-like flexible member that can be stretched over the window. The window also helps guide the end of the disk drive during the insertion/removal process and can also help secure the disk drive in place, together with the connectors and the resilient element, when clamped.

In a preferred embodiment, the window is rectangular.

In a preferred embodiment, the window is sized to receive the end of a 3.5 inch disk drive therethrough. In another preferred embodiment, the window is sized to receive the end of a 2.5 inch disk drive therethrough.

In a preferred embodiment, the resilient biasing element entirely covers the window. This helps secure the end of the disk drive in place and reduce vibration.

In a preferred embodiment, wherein the resilient biasing element is an elastic membrane attached at least partially over the window. An elastic membrane is simple to implement. The membrane can also be thin, so that it does not protrude to a large extend behind the disk drive when clamping the disk drive. This helps save the space required for the clamp assembly. The elastic membrane also helps control vibration of the disk drive in use.

In a preferred embodiment, when a disk drive having said disk drive connector at a first end is clamped by the clamp assembly, the biasing element provides a biasing force to the end of the disk drive opposite said first end.

In a preferred embodiment, the biasing element has a first portion that is fixed relative to the substrate and a second portion that contacts the disk drive when providing said biasing force to the disk drive, and "d1" defines the distance between the first portion and the second portion in the biasing direction when the disk drive is connected to the substrate connector, and "d2" defines the distance between the first portion and the second portion in the biasing direction when the drive connector is disconnected from and just clear of the substrate connector, wherein d2 is greater than d1.

This helps save space required for the clamp assembly. Note, as will be appreciated, when the connectors are disconnected they must at first be moved relative to each other in the "plugging" direction of the connectors. Once they have sufficiently separated from each other (i.e. they are just clear of each other), they can then be moved apart in other directions.

In a preferred embodiment, the clamp assembly comprises a housing around the substrate, wherein the substrate is movable between a received position and a withdrawn relative to the housing such that in the withdrawn position the clamp assembly is accessible for insertion and/or removal of a disk drive, wherein the distance between the housing and the first portion of the biasing element is less than d2 but greater than d1.

This arrangement means that the space occupied by the clamp assembly within the housing is minimised. The greatest extent of the deformation of the biasing element necessary for the clamping operation is accomplished outside of the housing. The biasing element in its clamping position is deformed backwards to some extent, which space needs to be accommodated within the housing. The biasing element is deformed even more so during the clamping operation to allow the disk drive connector to clear the substrate connector. This greater deformation can be performed when the substrate is outside of the housing, when the space available for the deformation is not constrained by the periphery of the housing. This difference between the deformation of the biasing element when clamping the disk and when inserting the disk is effectively space saved within the housing which can be used for other things, for example airflow or maximising the number of disk drives in the apparatus.

According to a second aspect of the present invention, there is provided a method of clamping a disk drive to a substrate, the disk drive having a disk drive connector, the method comprising: moving the disk drive against the bias of a resilient biasing element mounted to the substrate; connecting the disk drive connector and the substrate connector; and, moving the disk drive with the bias of the biasing element to a clamped position, in which position the biasing element biases the disk drive and the substrate connector together.

Embodiments of the present invention will now be described by way of example with reference to the accompanying drawings, in which:

FIG. 1A shows an example of a clamp assembly in accordance with an embodiment of the present invention;

FIG. 1B shows the clamp assembly of FIG. 1 from reverse;

FIGS. 2A and 2B show from above and from the side an initial step in the process of clamping a disk drive with the clamp assembly of FIGS. 1A and 1B;

FIGS. 4A and 4B show from above and from the side a further next step in the process of clamping a disk drive with the clamp assembly of FIGS. 1A and 1B; and, FIGS. 5A and 5B show from above and from the side the final position of the process of clamping a disk drive with the clamp assembly of FIGS. 1A and 1B.

Figure 3A:
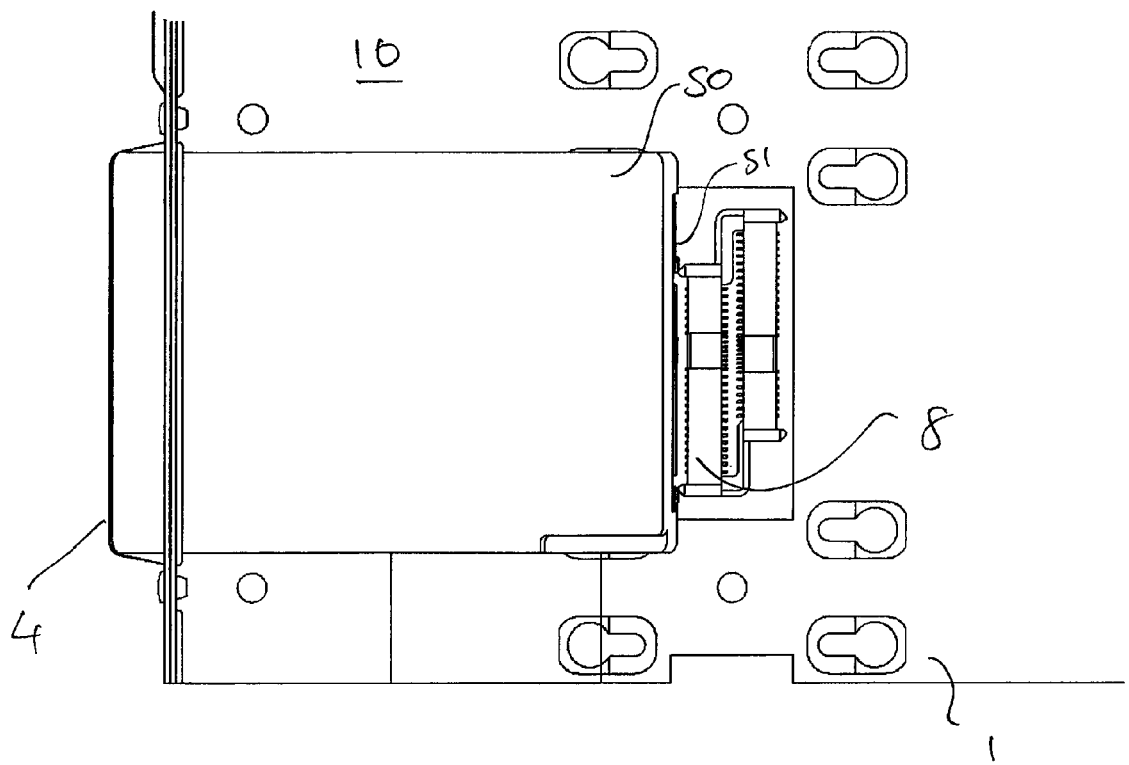
FIGS. 3A and 3B show from above and from the side a next step in the process of clamping a disk drive with the clamp assembly of FIGS. 1A and 1B.

FIG. 1A shows an example of a clamp assembly 10 in accordance with an embodiment of the present invention. FIG. 1B shows the same clamp assembly 10 from the reverse angle. In fact, FIGS. 1A and 1B show a plurality of clamp assemblies 10, some populated with disk drives and some not populated with disk drives. Only one example of clamp assembly 10 is described herein.

The clamp assembly 10 comprises a substrate 1, in this example comprises a sheet metal member. A projecting member 2 projects from the substrate 1 at an edge of the substrate 1. In this example, the projecting member 2 can be formed by simply bending the sheet metal substrate 1 through 90° to form a perpendicular section. The projecting member 2 has a window 3 defined in it. In this example, the window 3 is a rectangular cut-out in the sheet metal of the projecting member 2. The window 3 is sized to accommodate the end of a disk drive unit 50.

The window 3 has an elastic membrane 4 disposed across the opening of the window 3. The membrane 4 may be fixed in place by being sandwiched between a backing plate 5 and the projecting member 2, with rivets 6 being used to fix the two together. The backing plate 5 also has a window corresponding to the window 3 in the projecting member 2. In the present example, the backing plate 5 has flanges 7 surrounding the window 3 to provide protection to the membrane 4 when the disk drive 50 is clamped with the clamp assembly 10. (Note, the flanges 7 are not shown in FIGS. 2 to 5 for clarity.)

In the present example, the clamp assembly 10 is intended for use with a standard 3.5 inch disk drive, which has a width of approximately 101.6 mm and a height of approximately 26.1 mm (as specified in the industry standard specification SFF-8301). As will be appreciated, the present invention can be used with other size disk drives, for example with a standard 2.5 inch disk drive, which has a width of approximately 70 mm and a height of approximately 15 mm. Preferably the window 3 is sized to leave a gap of at least 1 mm between the sides of the window 3 and the sides of the disk drive 50, in order to allow space for the disk drive 50 to be maneuvered. A larger gap can be provided according to the application. For example, a gap of from 1 mm to 5 mm or from 5 mm to 10 mm or larger can be provided between the sides of the window 3 and the sides of the disk drive 50. A larger gap, may be for example be preferable in providing more isolation for the disk drive 50 from external vibration.

The clamp assembly 10 also comprises a connector 8 supported by the substrate 1 (the "substrate connector" as referred to herein). The connector 8 faces the window 3 in the projecting member 2. The connector 8 is arranged to mate with the disk drive connector 51 in the rear face 50B of the disk drive 50. The connector 8 supplies power to the disk drive, and/or carries data signals and/or control signals to/from the disk drive.

In the present example, the substrate connector 8 is a right angle connector mounted on the substrate 1. However, other ways of mounting the connector 8 are contemplated. For example, referring to FIG. 1, a printed circuit board (PCB) (not shown) could be fixed perpendicular to the substrate 1, running along the middle of the substrate 1 between the ends 50a of the disk drives 50, on which the connectors 8 can be mounted facing away from the PCB towards their respective windows 3.

To clamp the disk drive 50 with the clamp assembly 10, the disk drive 50 is first maneuvered into position approximately above the clamp assembly 10. In this position, the front end 50A of the disk drive 50 faces the window 3. As shown in FIGS. 2A and 2B, the disk drive 50 is advanced in the direction shown by arrow 55 towards the window 3. It will be noted that the disk drive 50 has a slight incline to the plane defined by the support structure 1 in this position, caused by the necessity for the rear of the disk drive 50 to clear the connector 8 on the substrate 1.

Figure 3B:
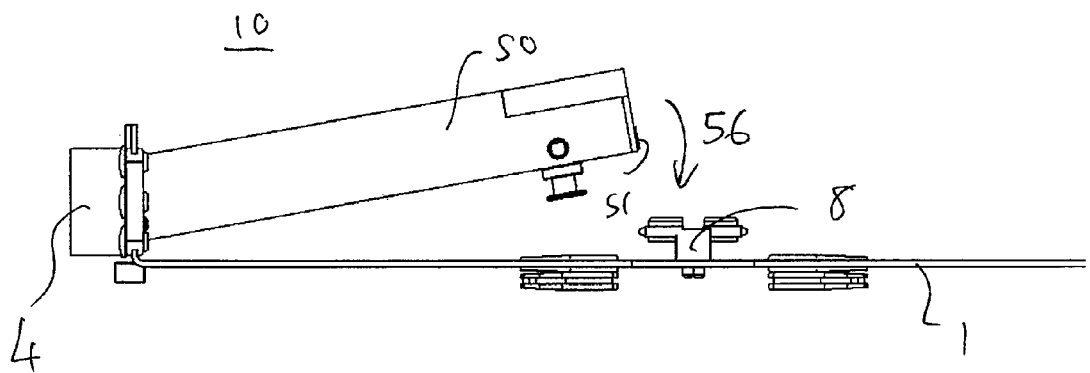

As shown by FIGS. 3A and 3B, the disk drive 50 is advanced until the front end 50a of the disk drive 50 passes through the window 3 in the projecting member 2. The elastic membrane 4 deforms around the end of the disk drive 50 as the disk drive 50 advances, and provides a biasing force against the motion of the disk drive 50. The disk drive 50 is advanced until the disk drive connector 51 clears the connector 8 on the substrate 1. The disk drive 50 is now rotated downwards as shown by arrow 56 in FIG. 3B until the disk drive connector 51 draws level with the connector 8 on substrate 1. This position is shown for example in FIGS. 4A and 4B.

Finally, the disk drive 50 is moved towards the connector 8 as shown by arrow 57, until the disk drive connector 51 mates with the connector 8 on the substrate 1. The bias of membrane 4 helps this movement and the mating of the connectors 8, 5.

The final mating position of the disk drive 50 clamped by the clamp assembly 10 is shown by FIGS. 5A and 5B. As can be seen, the disk drive 50 is held at its rear end by the connection between its connector 51 and the connector 8 on the substrate 1. The front end 59A of the disk drive is held by the biasing force applied by the membrane 4.

Thus the clamp assembly 10 provides a simple and convenient way of clamping a disk drive 50 to a substrate 1. The insertion of the disk drive 50 can be carried out manually, for example by the operator simply gripping the disk drive 50 by its side faces and manipulating it as described above. Alternatively, robotics may be used to manipulate the disk drive 50, as are known in the art per se.

The elastic membrane 3 can also be configured to help damp vibration caused for example by rotation of the disk within the disk drive 50.

To remove a disk drive 50 from the clamp assembly 10, the sequence of operations described above is performed in reverse.

Another advantage of the preferred embodiment is that very little additional space is taken up beyond the space occupied by the disk drive 50 itself for manipulating the disk drive 50 and by the clamp assembly 10. This preferably achieved by having a window 3 in the projecting member 2 through which the end 50a of the disk drive protrudes. This allows the projecting member 2 to be positioned level or in front of the front face 50a of the disk drive 50. Thus, this preferred embodiment has the advantage that no space in front of the front face 50a of the disk drive is needed for the projecting member 2. In contrast, other possible biasing arrangements, for example using a spring between the front end 50A of the disk drive 50 and a support member, which would require that the support member was positioned in front of the front face 50a of the disk drive 50, which would mean that the clamp assembly took up more space on the substrate 1.

This embodiment is therefore advantageous in applications where the space for a disk drive 50 is limited. For example, referring back to FIGS. 1A and 1B, the apparatus in which the disk drives 50 are used, may be a storage enclosure containing a plurality of disk drives 50, where it is desirable to maximise the number of disk drives 50 in the space provided by the enclosure.

The preferred embodiment of the present invention is particularly advantageous when used in an apparatus where the substrate 1 is in a housing and can be withdrawn from the housing to allow access to the disk drives for their removal and/or insertion. For example, storage enclosures are known where a plurality of disk drives are mounted in a drawer, which slides on runners relative to a housing. FIGS. 4A, 4B and 5A, 5B show an example of a clamp assembly 10 used with such an enclosure. In FIGS. 4A and 5A reference numeral 200 represents a cross-section of a housing, with respect to which the substrate 1 can be moved to a withdrawn position (movement in direction 201) and to a received position in the housing (movement in direction 202). In this embodiment, the window 3 and membrane 4 are positioned towards the periphery of the substrate 1, so as to be up against the housing 200 when the substrate is received in the housing 200.

FIGS. 4A and 4B show the maximum deformation of the membrane 3 during the process of clamping a disk drive 50 with the clamp assembly 10. In this position, the membrane 3 is deformed until the disk drive connector 51 clears the connector 8 on the substrate 1. The distance deformed by the membrane 4 beyond the window 3 is indicated by reference numeral 58. As previously described, when the disk drive connector 51 mates with the connector 8 on substrate 1, the disk drive 50 moves back towards the connector 8. Thus, in the received position shown in FIGS. 5A and 5B, the deformation of the membrane 4 beyond the window 3 is smaller than the maximum deformation 58, and is indicated in FIGS. 5A and 5B as reference numeral 59.

As previously explained, the substrate 1 is withdrawn from the housing 200 for insertion and/or removal of disk drive units 50. This means that the housing 200 does not have to accommodate the maximum deformation 58 of the membrane 4 that occurs during the insertion/removal process, since this maximum deformation 58 only occurs when the substrate is withdrawn from the housing 200 and therefore unconstrained by the size of the housing 200. Instead, the housing 200 needs only to accommodate the lesser deformation 59 of the membrane 4 that occurs when the disk drive 50 is fully inserted into the clamp assembly 10. In other words, the substrate 1 being withdrawn from the housing 200 for disk drive insertion/removal means that the gap between the projecting member 2 and the housing 200 must be no less than distance 59; whereas, if the substrate 1 was not withdrawn from the housing 200 for disk drive insertion/removal, then the distance between the projecting member 2 and the housing 200 must be no less than distance 58. Thus, this embodiment allows less space to be set aside between the clamp assembly 10 (and in particular the projecting member 2) and the housing 200. This can allow more space in the housing 200 to be used for other purposes, for example fitting in more disk drives 50 or airflow for cooling the disk drives 50.

Embodiments of the present invention have been described with particular reference to the example illustrated. However, it will be appreciated that variations and modifications may be made to the examples described within the scope of the present invention.

In particular, the present invention is not limited to being used with 3.5 inch disk drives. 2.5 inch disk drives, or in principle any size disk drives can be used instead with suitable modifications to the dimensions of the clamp assembly. Additional guide members can be provided on the substrate to help guide the disk drive during the insertion/removal process, or to retain the disk drive in the clamped position. Other suitable biasing elements can be used other than an elastic membrane.

Also, in the specific example described above, the substrate connector 8 is attached to the substrate 1 and the resilient biasing element 4 is disposed at the other end of the disk drive 50 from the disk drive connector 51 to bias the disk drive 50 and the substrate connector 8 together. In an alternative scheme (not shown), the substrate connector 8 can be mounted to the resilient biasing element 4. In this scheme, a support structure is arranged on the substrate 1 at the opposite end 50A of the disk drive 50 to the connector. When inserted into the clamp assembly, the biasing element biases the together the disk drive 50 and the substrate connector 8, with the disk drive butted up against the support structure. This arrangement has similar advantages to the specific example shown in FIGS. 1A,B to 5A,B above in biasing the disk drive 50 and the substrate connector 8 together, ensuring a secure, positive connection, damping vibration, whilst not requiring tools, etc.

The invention claimed is:

1. A clamp assembly for clamping a disk drive to a substrate, the disk drive having a disk drive connector, the clamp assembly comprising:
   a resilient biasing element mounted to a surface of the substrate; and,
   a substrate connector,
   wherein when a disk drive connector is connected to the substrate connector, the resilient biasing element applies a biasing force to the disk drive substantially in the direction of the substrate connector so as to preload the disk drive against the substrate connector, the resilient biasing element being provided by an elastic membrane which is deformed by the disk drive in a direction substantially parallel to the surface of the substrate and away from the substrate connector.

2. A clamp assembly according to claim 1, wherein the substrate connector is fixed relative to the substrate.

3. A clamp assembly according to claim 2, wherein the substrate connector has a plugging direction directed towards the biasing element.

4. A clamp assembly according to claim 2, wherein when a disk drive having said disk drive connector at a first end is clamped by the clamp assembly, the biasing element provides a biasing force to the end of the disk drive opposite said first end.

5. A clamp assembly according to claim 2,
   wherein the biasing element has a first portion that is fixed relative to the substrate and a second portion that contacts the disk drive when providing said biasing force to the disk drive, and "d1" defines the distance between the first portion and the second portion in the biasing direction when the disk drive is connected to the substrate connector, and "d2" defines the distance between the first portion and the second portion in the biasing direction when the drive connector is disconnected from and just clear of the substrate connector, wherein d2 is greater than d1.

6. A clamp assembly according to claim 5, comprising a housing around the substrate,
   wherein the substrate is movable between a received position and a withdrawn relative to the housing such that in the withdrawn position the clamp assembly is accessible for insertion and/or removal of a disk drive,
   wherein the distance between the housing and the first portion of the biasing element is less than d2 but greater than d1.

7. A clamp assembly according to claim 1, wherein the depth of the biasing element in the biasing direction is less than 10 mm.

8. A clamp assembly for clamping a disk drive to a substrate, the disk drive having a disk drive connector, the clamp assembly comprising:
   a resilient biasing element mounted to the substrate; and,
   a substrate connector,
   wherein when a disk drive connector is connected to the substrate connector, the resilient biasing element applies a biasing force to the disk drive substantially in the direction of the substrate connector so as to preload the disk drive against the substrate connector, the clamp assembly further comprising a support member projecting from the substrate, the biasing element being fixed to the support member and applying said biasing force to an end of the disk drive, wherein, when a disk drive is connected to the substrate connector, the support member does not protrude beyond said end of the disk drive in the biasing direction.

9. A clamp assembly according to claim 8, wherein the support member has a window defined therethrough, the biasing element being at least partially disposed about the window, wherein when a disk is connected to the substrate connector, an end of the disk drive passes through the window.

10. A clamp assembly according to claim 9, wherein the window is rectangular.

11. A clamp assembly according to claim 10, wherein the resilient biasing element entirely covers the window.

12. A clamp assembly according to claim 9, wherein the resilient biasing element is an elastic membrane attached at least partially over the window.

13. A method of clamping a disk drive to a substrate with a clamp assembly, the disk drive having a disk drive connector, the clamp assembly comprising:
   a resilient biasing element mounted to the substrate; and,
   a substrate connector,
   wherein when a disk drive connector is connected to the substrate connector, the resilient biasing element applies a biasing force to the disk drive substantially in the direction of the substrate connector so as to preload the disk drive against the substrate connector,
   the clamp assembly further comprising a support member projecting from the substrate, the biasing element being fixed to the support member and apple said biasing force to an end of the disk drive, wherein, when a disk drive is connected to the substrate connector, the support member does not protrude beyond said end of the disk drive in the biasing direction, the method comprising:
   moving the disk drive against the bias of a resilient biasing element mounted to the substrate during which the disk drive connector is not connected to the substrate connector; and,
   moving the disk drive with the bias of the biasing element to a clamped position in which the disk drive connector connects with the substrate connector, in which position the biasing element applies said biasing force to the disk drive.

14. A method according to claim 13,
   wherein the substrate connector is fixed relative to the substrate,
   the method comprising, before said connecting step, aligning the disk drive connector and the substrate connector.

15. A method according to claim 14, wherein the substrate has a support member projecting therefrom, the biasing element being fixed to the support member and applying said biasing force to an end of the disk drive, wherein when the disk drive is connected to the substrate connector, the support member does not protrude beyond said end of the disk drive in the biasing direction.

16. A method according to claim 15, comprising passing the disk drive through a window in the support member when moving the disk drive against said bias, the biasing element being at least partially disposed about the window.

17. A method according to claim 16, wherein the resilient biasing element is an elastic membrane attached at least partially over the window.

18. A method according to claim 13,
wherein the biasing element has a first portion that is fixed relative to the substrate and a second portion that contacts the disk drive when providing said biasing force to the disk drive, and "d1" defines the distance between the first portion and the second portion in the biasing direction when the disk drive is connected to the substrate connector, and "d2" defines the distance between the first portion and the second portion in the biasing direction when the drive connector is disconnected from and just clear of the substrate connector, wherein d2 is greater than d1.

19. A method according to claim 18, wherein the substrate has a housing around it, the method comprising:
moving the substrate from a received position to a withdrawn position relative to the housing such that in the withdrawn position the clamp assembly is accessible for insertion and/or removal of a disk drive;
inserting and/or removing a disk drive from the clamp assembly,
wherein the distance between the housing and the first portion of the biasing element is less than d2 but greater than d1.

\* \* \* \* \*